June 30, 1931.  A. L. GENTER  1,812,042
CONTINUOUS FILTER
Filed Oct. 2, 1929  9 Sheets-Sheet 3

INVENTOR.
Albert L. Genter
BY
ATTORNEY.

June 30, 1931. A. L. GENTER 1,812,042
CONTINUOUS FILTER
Filed Oct. 2, 1929 9 Sheets-Sheet 4

INVENTOR.
Albert L. Genter
BY
ATTORNEY.

INVENTOR.
Albert L. Genter
BY Henry Love Clarke
ATTORNEY.

June 30, 1931. A. L. GENTER 1,812,042
CONTINUOUS FILTER
Filed Oct. 2, 1929 9 Sheets-Sheet 6

INVENTOR.
Albert L. Genter
BY
ATTORNEY.

June 30, 1931.  A. L. GENTER  1,812,042
CONTINUOUS FILTER
Filed Oct. 2, 1929   9 Sheets-Sheet 7

Fig. 13.
Extreme Pos. #1. Travel - 0°.

Fig. 14.
Extreme Pos. #2. Travel 180°

Fig. 15.
Extreme Pos. #3. Travel 360°

INVENTOR.
Albert L. Genter.
BY Henry Love Clarke
ATTORNEY.

June 30, 1931.  A. L. GENTER  1,812,042
CONTINUOUS FILTER
Filed Oct. 2, 1929    9 Sheets-Sheet 8

Fig. 16.

Inventor
Albert L. Genter.
By Henry Love Clarke
Attorney

Patented June 30, 1931

1,812,042

UNITED STATES PATENT OFFICE

ALBERT L. GENTER, OF BALTIMORE, MARYLAND, ASSIGNOR TO THE BARTLETT HAYWARD COMPANY, OF BALTIMORE, MARYLAND, A CORPORATION OF MARYLAND

CONTINUOUS FILTER

Application filed October 2, 1929. Serial No. 396,625.

This invention relates in general to filters in which filter cake is recovered from solutions or sludges by deposit of solids therefrom by suction on a filtering medium through which the liquid constituent of the deposited solids is drawn off, and in which the deposited solid is drained or dried while on the filtering medium and subsequently removed therefrom by air pressure before the filter medium is again employed for deposit of solids thereon by suction.

In its more specific aspects, the present invention relates to continuous rotary suction filters wherein a rotating drum or the like is partially submerged in the liquid and solid mixture to be separated by filtration, said drum being provided with filtering surfaces disposed in a series of spaced filtering compartments which permit the layer of intercepted solids to be removed from the exterior of each such compartment at a proper discharge point above the submerged level by the automatic application of air pressure.

Objects of the present invention are: a more efficient deposit of the coarser or larger sizes of solids fed into the filter with the unfiltered mixture; to advance the filtering compartments progressively forward through the unfiltered mixture and to agitate the unfiltered mixture, during filtration, by moving the filter compartments alternately forwardly and backwardly in the path through which they are progressively advanced; the provision of a filter of the above mentioned type which will be of simple manufacture at reasonable cost and readily and easily assembled; the provision of a filter of the above mentioned type so constructed as to be compactly arranged and not require frequent repair or replacement of parts; and such other objects and advantages as may be found to obtain in the apparatus hereinafter set forth or claimed.

In the accompanying drawings, forming a part of this specification, and showing, for purposes of exemplification, a preferred form and manner in which the invention may be embodied and practiced, but without limiting the claimed invention to such illustrative instance or instances:

Referring to Figs. 1 to 5 there is shown a longitudinally extending tank or container 10 having ends 11, a bottom 12 curved transversely of its length, and an open top provided with outwardly extending marginal flange members 13. Arranged respectively at the ends of the tank are two drum-end members 14. The end members 14 are respectively provided with annular trunnion-engaging members 15 and are supported for rotation within said tank by trunnions 16 on which the trunnion engaging members 15 ride during rotation, or rotary movement, of said end members. The trunnions at each end of the tank are respectively supported by stationary frames 17 that rest upon the flange members 13 at the respective ends of the tank 10. The end members 14 are maintained in spaced relation, relative to each other, by means of tie-rods 18 arranged between filter units 19 carried by said end members.

Figure 7:
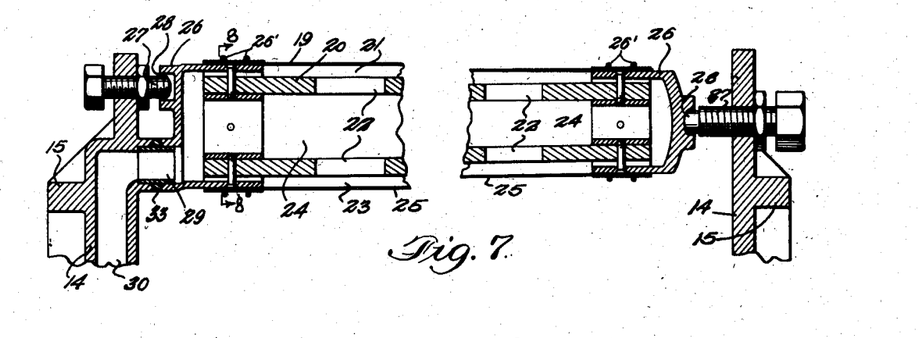
Fig. 7 is an enlarged vertical longitudinal sectional view of one of the filter elements taken on the line 7—7 of Fig. 1.
Figure 8:
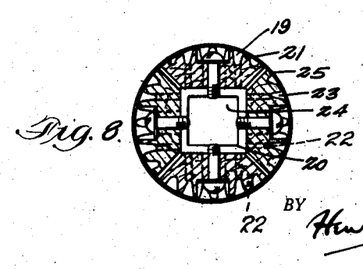
Fig. 8 is a transverse vertical sectional view taken on the line 8—8 of Fig. 7.
Figure 9:
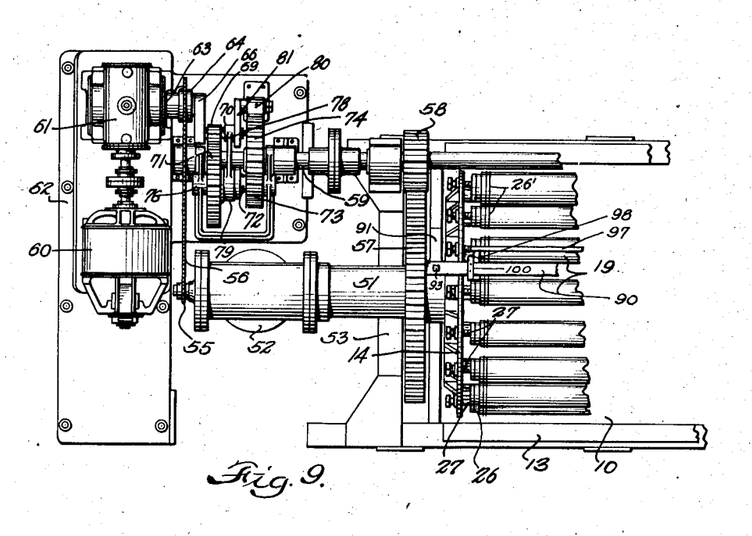
Fig. 9 is a plan view of the driving means for the filter drum.
Figure 10:
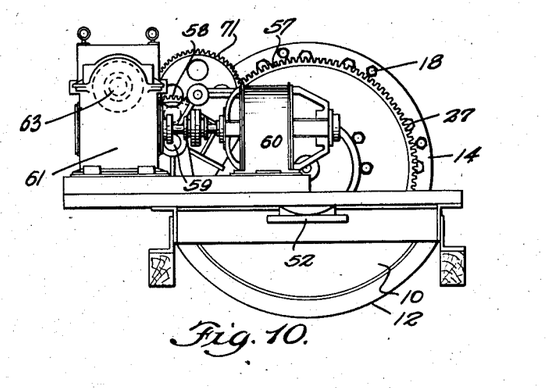
Fig. 10 is an end elevational view of the same.
Figure 11:
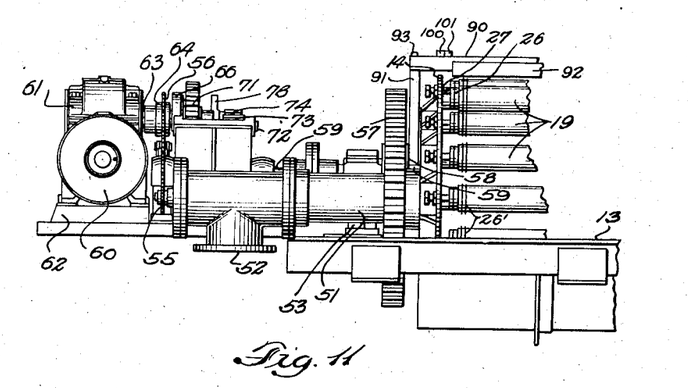
Fig. 11 is a side elevational view of the same.

A series of filter units 19 is mounted between and arranged in spaced relation around the peripheral edges of the drum-end members. Each of the filter units extend horizontally for substantially the full length of the tank from end member 14 to end member 14 and comprises a horizontally disposed hollow, rigid tubular member 20 having longitudinally extending ribs or corrugations 21 and a series of slots 22 communicably connecting the channels 23, formed by said ribs 21, with a channel 24 in the interior of said tubular member 20. Each of the units is covered with a sock 25 of porous filter medium which is wound, or preferably, stretched over the ribs 21 from end to end of the unit and clamped in a leak-proof manner over caps 26 by means of binders 26' (Fig. 7). The ribs prevent the tightly stretched sock from too great movement into and away from the spaces 23 between the ribs 21 and thus afford, beside the channel space between them, ample protection against tearing of the sock by reason of constant creasing thrust on the fabric during alternate suction and blowing operations. Each of the filter units 19 is circular in cross-section and tapered lengthwise, with the larger ends of all of the units arranged at one and the same end of the drum, where these elements 19 communicate with exhaust conduits and air-blast conduits. The tubular elements 19 with their sock coverings are respectively provided at each end with closure caps 26 and are held between the end members 14 by means of compression screws 27 whose ends fit in closed recesses 28 in the caps 26. The filter elements 19 are held suspended between the end members 14 by said compression screws 27 so that the wider ends of the tapered elements are slightly closer to the horizontal axis of the series of elements than the narrower ends in order to facilitate control of flow of fluid into and out of the elements 19 and so as to facilitate drainage of liquid from one end to the other of the respective elements after they have been brought out of submergence. Each of the elements 19 is closed against passage of fluid at its narrower end and each is provided at its wider end with a nipple opening 29 for exhaust of fluid while under suction, and for supply of fluid, such as air, in alternation. Preferably, the nipple opening 29 is arranged eccentrically of the horizontal axis of the unit, and located with respect to the channel 24 and the channels 23 between the ribs 21 so that the nipple opening 29 communicates with both the channel 24 and the channels 23 between the strips or corrugations that are closest to the axis of rotation of the end members 14 and the series of elements 19 in order to further regulation and control of the flow of fluid to and from the respective units and to insure complete drainage of flowing liquid from between the socks 25 and the strips or corrugations 21 when the respective elements 19 are at their highest elevation.

The end member 14 adjacent the larger ends of the tapered elements 19 is provided with a series of radially extending conduits 30 integral with said end member and terminating in an annular series of horizontally disposed conduits 31 arranged in a concentric series in a central valve body 32 formed integral with and located to the outer side of the end member 14.

The central valve body 32 and the series of horizontally disposed conduits 31 rotate as a unit with the series of conduits 30, end members 14 and annular peripheral series of filtering elements 19.

Each of the conduits 30 and its horizontal conduit 31 in the central valve body 32 is individual to an element 19, so that each element 19 is provided with one of the conduits 30 and a horizontal conduit 31. Each of the conduits 30 is communicably connected with its respective element 19 by means of the nipple 29. An annular gasket 33 is interposed between the conduit 30 and the nipple 29 to insure a gas and liquid seal at the juncture.

In order to provide for drawing liquid from the bath in the tank 10 so as to deposit solid matter in said bath onto the outer surfaces of filtering medium 25 on the elements 19, and for blowing filter cake or solid material off of the filtering medium 25 to discharge filter cake or recovered solid from said bath, and to enable the filtering elements to be again used for another filtering operation after each completes the rotary cycle of the annular peripheral series of filter units, there is provided a double-acting valve means for drawing liquid by suction from the bath in the tank 10 through the filtering medium 25 on the filter elements 19, the conduits 30 and 31, and to a point of discharge 34, and for supplying a blast of air from pipe 35 through the conduits 31 and 30 and channels 24 and 23 in the elements 19 to blow off filtered solid material or filter cake, after the elements have been rotated out of submergence and have been subjected to drainage and drying, at a point in the rotary path where it is desired to discharge the recovered filtered solids, or cake, from the filter. As illustrated, such means comprises a stationary valve housing 36 mounted on brackets 37, attached to the end 11 of the tank adjacent the end member 14 having the series of conduits 30 and 31 and the central valve body 32. The valve housing 36 is provided with bridges so as to provide a suction chamber 38, a compressed air chamber 39 and a portion 40 that is blanked off to permit the filter units, one or a plurality of units at a time, to be sealed off from both suction and air pressure. The suction chamber 38 is communicably connected with suction outlet 34 that is under suction from a suction inducing means (not shown). The compressed air chamber 39 is communicably connected with a compressed air inlet 35 that is adapted to supply compressed air to the chamber 39 from a compressed air supply means (not shown).

The central valve body is provided with an annular beveled bearing surface 41 for engagement with an annular beveled seat 42 therefor on the housing 36. These beveled surfaces are given a 45° slope in order to prevent binding between the body and housing and to insure uniform wear.

Figure 1:
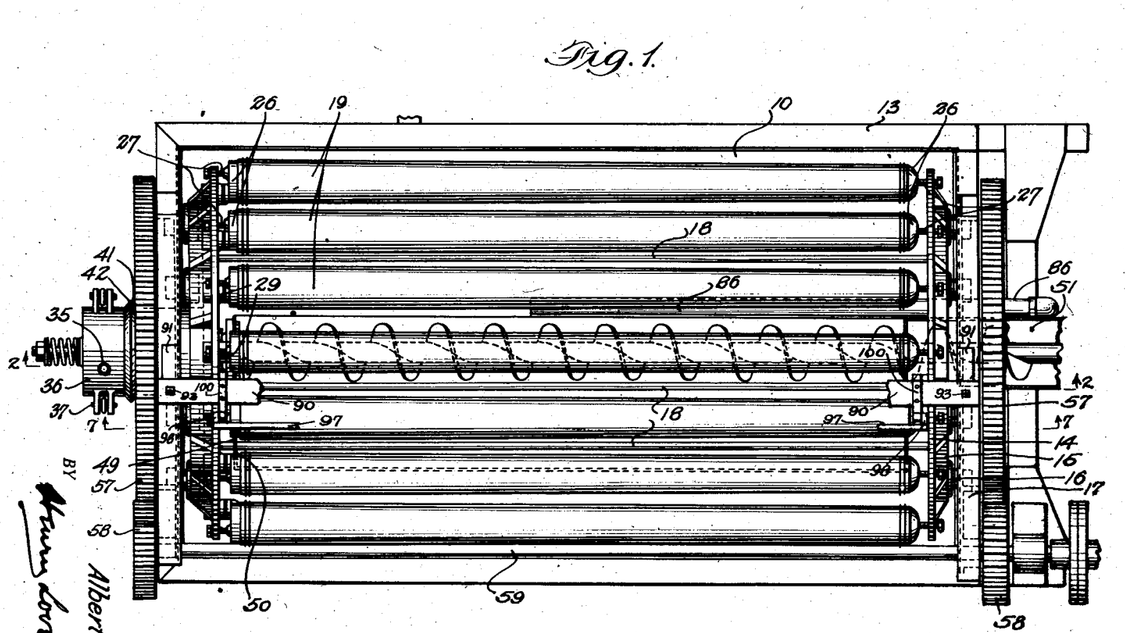
Figure 1 is a top plan view of a continuous rotary suction filter embodying the present invention.
Figure 2:
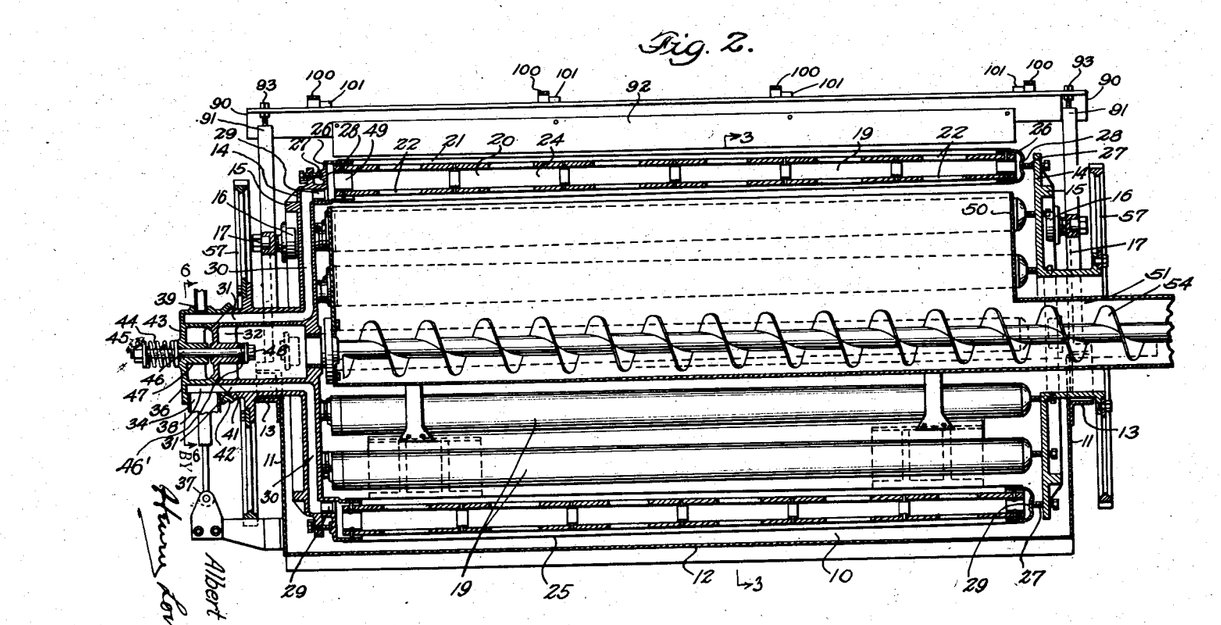
Fig. 2 is a longitudinal vertical sectional view taken on the lines 2—2 of Fig. 1.
Figure 3:
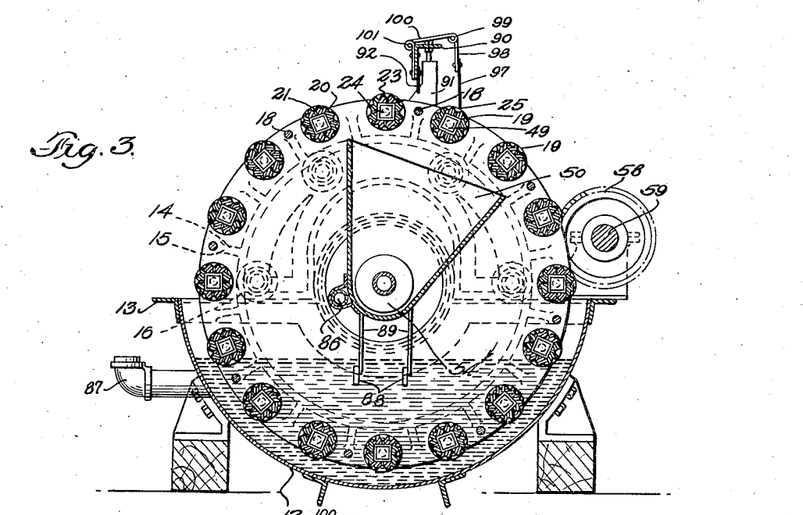
Fig. 3 is a transverse vertical cross-sectional view taken on the lines 3—3 of Fig. 2.

The housing 36 is maintained in close engagement with the valve body by means of a yoke 43 on the housing, adapted to be pressed towards the valve body by means of a compression spring 44 interposed between the yoke 43 and a nut 45 on a stem 46 that extends through the housing 36 and through a rotatable bearing 47 in the central valve body in which the stem is maintained by means of a nut 48 threaded thereon to engage against said bearing by means of ball thrust bearing 46' (Fig. 2).

The suction chamber 38 is given sufficient peripheral length to communicate through the respective conduits 31 and 30, as they revolve into communication therewith, with all of the filter units which then are in submergence in the bath in the tank 10 and with a plurality of filter elements, on the side of the tank where the units rise out of submergence, that have moved out of the bath and are above it, with solid material or filter cake on them. The air chamber 39 is arranged so as to communicate through the respective conduits 31 and 30, as they revolve into communication with said chamber, with each of the filter elements 19 as they respectively arrive in discharge position 49. When the respective elements 19 arrive at said position they are subjected to puffs or blasts of air which pass outwardly through the channels 24, 22 and 23 and the filtering medium 25, thus dislodging filtered material or filter cake retained on the surface of the filter medium of the respective units 19.

Extending within the annular peripheral series of filter elements 19 is an open top discharge hopper 50 loosely supported by the end member 14, provided with the central valve body and valve housing, at substantially the axis of rotation thereof. The hopper 50 extends longitudinally of the tank 10 and is provided with an outlet portion 51 that extends through the axis of rotation of the oppositely disposed end member 14, and is attached to and communicates with a discharge chute 52. The hopper is supported at the outlet end thereof by means of supporting angle irons 53.

The hopper may be arranged so as to have its open top extended beneath all or the greater portion of the filter units above the tank 10 but preferably the open top is arranged beneath only a few, as shown three, filter units on the side descending towards the bath in the tank. As illustrated, the hopper receives discharged filter cake from the elements 19 that are in a sector of substantially 30° of the circle formed by the annular peripheral series of elements 19, taken on a vertical cross-section of the series. In the present embodiment of the invention, it is the elements that are in such place that are brought into communication with the compressed air chamber for discharge of filtered solids or filter cake; and the filter elements that are on the side descending towards the bath in the tank and that are between the discharging elements and the top surface of the bath in the tank are the elements that have their conduits sealed off, by the blanked portion 40 of the housing, against both suction and air pressure. The said hopper 50 has its rear edge sufficiently advanced, in the direction of the forward travel of the filter elements, sufficiently to avoid intercepting drip from the elements that are passing through the drying sector of travel intermediate the filter bath and the filter-cake discharge sector over the mouth of said hopper. In the lower portion of the hopper 50 is provided a screw conveyor 54 that feeds the discharged filtered solids to the discharge chute 52. This screw conveyor is driven by sprocket 55 connected by a sprocket chain 56 with driving mechanism hereinafter described.

In order to rotate both of the end members 14 uniformly and without causing the horizontally disposed tubular elements 19 and tie-rods 18 to be subjected to torsion, such as would result if one end member 14 only is employed as the driven end for effecting progressive rotary movement of the annular peripheral series of elements, there are secured to both of the end members 14 for rotation therewith toothed gears 57 which are respectively in mesh with driving gears 58 that are directly opposite the respective gears 57 which they drive. The driving gears 58 are both mounted on a common shaft 59 which drives both gears 58 simultaneously and uniformly and takes up all the torsion.

It is a well known fact that most mixtures being filtered in various industries are far from homogeneous. The solid particles have various sizes and shapes and the coarser and heavier particles tend to classify out if the mixture is kept quiescent. To prevent this various agitators or stirrers have been devised and employed for drum type filters.

It has been the aim in the employment of these prior art agitators to whip or force the coarser and heavier particles onto the filtering medium and for such purpose they all operate adjacent to or near the filtering medium. In filters employing a series of elements spaced apart and rotated continuously in a forward direction, the heavier or coarser particles settle to the bottom of the tank by passing between the spaced apart elements with the result that the top surfaces of the units in the bath do not retain the proportion of solids that they should and the lower portions of the same elements do not draw up the heavier and coarser particles on the bottom of the tank because they have been covered with lighter and finer particles and the suction through the filter elements is not sufficient to draw up those heavier particles that have passed downwardly between the spaced apart filter elements.

In accordance with the present invention the above mentioned difficulties are overcome, an increase in efficiency of the recovery of solids by the filter elements per unit of time is effected, a greater proportion of the heavier and coarser particles is recovered by each filter unit, and the employment of agitators in close proximity to the filter elements is eliminated, by oscillating the annular peripheral series of tubular elements alternately backward and forward with a gradual or periodic advance on the forward oscillations in order that the tubular elements may be caused to complete a revolution about the central longitudinal axis of the apparatus in any desired time. Numerous known mechanical means may be employed for this purpose. The annular peripheral series of filter elements 19 may be caused to swing back and forth several times before advancing a step in their forward cyclic movement.

In illustrating such driving means on the drawings, there is preferably shown a mechanism whereby the annular peripheral series of filter elements are moved by an alternate forward movement and backward movement of lesser extent.

Referring to Figures 1, 9, 10, 11 and 12: There is shown a motor 60 and speed reducer 61 mounted on supporting frame work 62. Operatively connected with the speed reducer 61 is a shaft 63 provided with a sprocket-wheel 64 over which the sprocket chain 56 is mounted and by which the screw conveyor 54 in the discharge hopper 50 is driven. Eccentrically mounted at 65 on the outer end of the shaft 63, for rotation therewith, is a circular disc 66 that is fixed to said shaft at 65 and that is provided with adjustable means 67 for holding a variable eccentric 68. A pinion 69 is mounted on a stub shaft 70 extending outwardly from said variable eccentric 68 diametrically opposite or angularly displaced from the point at which the shaft 63 is secured to said variable eccentric. The pinion 69 and stub shaft 70 are fixed on the eccentric 68 so that they cannot rotate on their own axis with respect to the variable eccentric. The pinion 69 meshes with and supports a gear 71 fixed on a common shaft 72 with a gear 73 so that when gear 71 revolves or moves bodily the gear 73 must revolve or move bodily in the same manner and direction. Gear 73 meshes with a gear 74 that is fast to the driving shaft 59 to operate the same. The gear 73 is maintained in mesh with the gear 74 by means of an oscillating gear casing 75 that supports the shaft 72 at 76, and that is pivotally mounted on the driving shaft 59 at 77.

Figure 12:
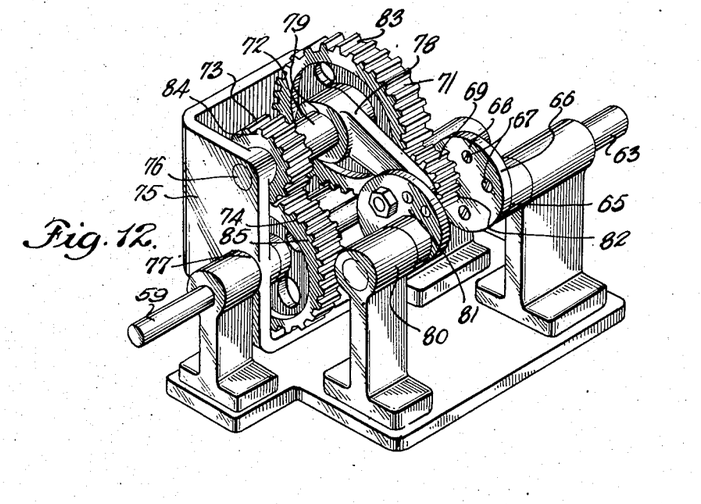
Fig. 12 is an enlarged perspective view of the planetary gear driving mechanism shown in Figs. 9 to 11.

The common shaft 72 carrying the gears 71 and 73 is also connected with the variable eccentric 68 by a crank arm 78 pivotally secured at 79 to the common shaft 72 and pivotally secured to the stub shaft 70, maintaining in mesh the gear 71 and pinion 69.

A bracket 80 having a rotatable disc 81 for connection with the stub shaft 70 is provided to support the stub shaft 70 and maintain it and the crank arm 78 in position during rotation of the stub shaft, which is adjustable in said disc 81.

Figures 13, 14, 15:
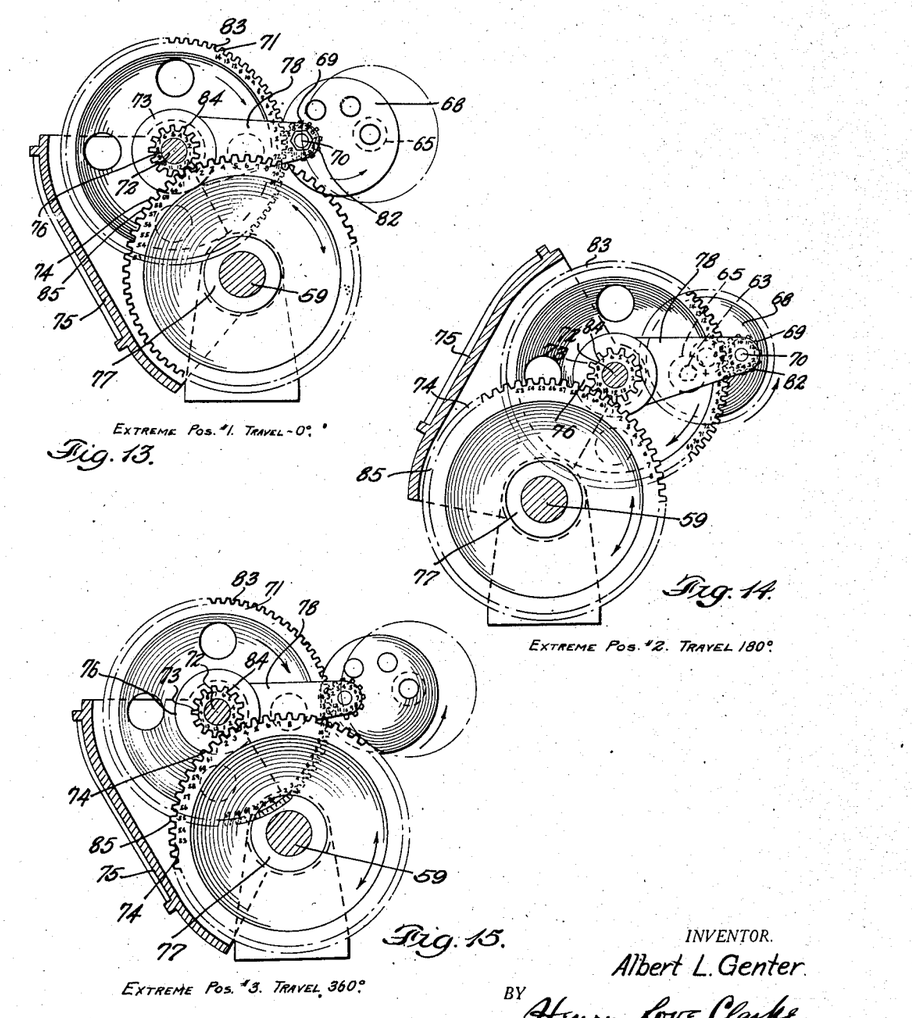
Fig. 13 is a diagrammatic sectional elevational view showing the first extreme position of the gears shown in Figs. 9 to 12 indicating the 0° position of the travel.
Fig. 14 is a view similar to Fig. 13 but showing the second extreme position of the gears in which the travel of the drive-shaft is at 180°.
Fig. 15 is a view similar to Fig. 13 but showing the gears bodily swung back to the first position and as turned at the end of 360° travel of the drive-shaft.
Figure 16:
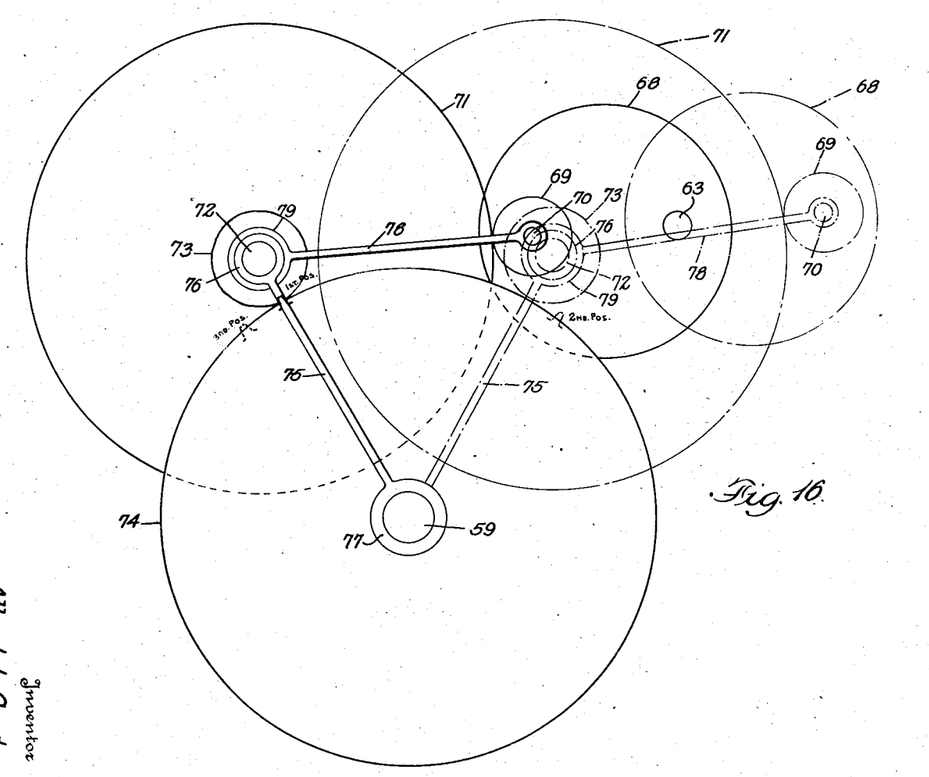
Fig. 16 is a line diagram of the planetary gear movement illustrated in Figs. 13-15.

The operation of the above described operating mechanism results in a backward and forward oscillation of the annular peripheral series of filter elements on the trunnions 16 during each complete revolution of the variable eccentric 68, with an advance of the series on the forward oscillation. The forward direction of movement of the series of elements 19 is governed by the direction of rotation of the shaft 63. As shown, the motor 60 and speed reducer 61 drive the shaft 63 and variable eccentric 68 in a counter-clockwise direction. It will be noticed from Figs. 13 to 16 that as the variable eccentric revolves it pulls, through crank arm 78, the gears 71 and 73 clockwise, from starting or extreme position 1 (in which the travel of the eccentric 68 and pinion 69 is 0°) shown in Fig. 13, on an arc around gear 74 and shaft 59 as the axis, to extreme position 2 (in which said travel is 180°) as shown in Fig. 14. On the first downward half of the revolution of the variable eccentric, with the shaft 63, the rigid pinion 69 counts off half of its teeth 82 on the gear 71 in a counter-clockwise direction, thus forcing gears 71 and 73 and shaft 72 to rotate around the axis of shaft 72 the same number of teeth 83 in a clockwise direction. Gears 71 and 73 and their shaft 72 swing downwardly on an arc in a clockwise direction around gear 74, with shaft 59 as the axis, concurrently with the rotation of the gears 71 and 73 and their shaft 72 in a counter-clockwise direction. The gears 71 and 73 and shaft 72 being both bodily swung in a clockwise direction on said arc and rotated in a clockwise direction, gear 73 counts off a certain ratio of its teeth 84, determined by degrees of rotation of gears 71 and 73 and shaft 72, in clockwise direction, on gear 74, thus forcing gear 74 and its shaft 59 to rotate the same number of teeth 85 in counter-clockwise direction while said gear 73 is at the same time pulling gear 74 in a clockwise direction. Thus, the number of degrees of travel of gear 74 and its shaft 59, during such movement, from a given radius through said shaft 59 and gear 74, will be the arc of throw in a clockwise direction resultant from the swing of eccentric 68 and crank arm 78 minus the degree of rotation of gear 74 and shaft 59 in a counter-clockwise direction that results from the rotation of gear 71 and 73 and their shaft 72 clockwise during their bodily swinging movement in a clockwise direction.

On the next upward half of the revolution of variable eccentric 68, the variable eccentric will, through crank arm 78, push the gears 71 and 73 counter-clockwise, from extreme position 2 (in which the travel of eccentric 68 and pinion 69 has been 180°) shown in Fig. 14, on the same arc around the gear 74 and shaft 59 as the axis, back to extreme position 1, in which position the travel of the eccentric 68 and pinion 69 has been 180° from position 2 to position 1, and has been 360°, as shown in Fig. 15, from position 1 around position 2 and back to position 1. On this upward half of the revolution of the variable eccentric with the shaft 63, the rigid pinion counts off the remaining half of its teeth 82 on the gear 71 in a counter-clockwise direction, thus forcing gears 71 and 73 and shaft 72 to rotate around the axis of shaft 72 the same number of teeth 83 in a clockwise direction. Gears 71 and 73 and their shaft 72 swing upwardly, on the same arc that they previously swung downwardly on, in a counter-clockwise direction around gear 74 and shaft 59 as the axis, concurrently with the rotation of the gears 71 and 73 and their shaft 72 in a clockwise direction. The gears 71 and 73 and shaft 72 being both bodily swung in a counter-clockwise direction on said arc and rotated in a clockwise direction, gear 73 counts off a certain ratio of its teeth 84, the same number as was counted off on the downward half of the revolution of eccentric 68, in a clockwise direction, on gear 74, thus forcing gear 74 and its shaft 59 to rotate the same number of teeth 85 in a counter-clockwise direction, while said gear 73 is at the same time pushing gear 74 in a counter-clockwise direction, from the point to which the shaft 59 and gear 74 were swung at the extreme position 2 of the eccentric 68. Thus, the number of degrees of travel of gear 74 and its shaft 59, during such movement, from the point to which the shaft 59 and gear 74 were swung at the extreme position 2 of the eccentric, will be the arc of throw of the gear 74 and shaft 59 in a counter-clockwise direction resultant from the swing of eccentric 68 and crank arm 78 plus the degree of rotation of gear 74 and shaft 59 in a counter-clockwise direction that results from the rotation of the gears 71 and 73 and their shaft 72 clockwise during their bodily swinging movement in a counter-clockwise direction.

From the foregoing it will be seen that the oscillating shaft 59 gains in movement in a counter-clockwise direction, in a direction parallel to the direction of rotation of the variable eccentric 68 and its driving shaft 63, after every upward stroke of eccentric 68 and crank arm 78, or at every complete revolution of the driving shaft 63 and its variable eccentric 68. The gear ratios between gears 71 and 69 and between gears 73 and 74 may be varied to give different extent of progressive oscillation of the shaft for each complete revolution thereof and consequent different degrees of advance for each oscillation. The eccentric is mounted on the disc 66 so as to be variable, in order to permit varying the arc of oscillation to suit various sizes of filters and various conditions and exigencies of operation necessary to proper operation of the filter. As the shaft 59 carries the two gears 58 which respectively mesh with and drive the gears 57, the oscillatory movement is transmitted to each end of the filter without subjecting the ends or tie-rods 18 and filter elements 19 to torsion. As the oscillatory movement of the shaft 59 during its oscillatory movement is of greater extent in a counter-clockwise direction, i. e. parallel with the direction of rotation of the shaft 63, the gears 58 respectively impel the ends 14 and the series of filter elements 19 during each oscillation further in clockwise direction, towards the left as indicated by the drawings in Figs. 1, 3 and 5, than in counter-clockwise direction, so that the elements 19 emerge from the bath in the tank at the side thereof opposite the side at which the gears 58 engage the gears 57, and are re-submerged in the bath on the same side of the tank at which the gears 58 engage the gears 57.

Material to be filtered is introduced into the tank through inlet pipe 86 that extends between the central portion of the conveyor discharge end 51 and the trunnion support 17, into the interior of the oscillating cage of elements 19, and discharges material above the elements that are submerged in the bath in the tank 10. When such material is being introduced to the tank 10 from the inlet pipe 86, the elements 19 that are in submerged position beneath the discharge pipe are constantly oscillating backward and forward while under suction. Consequently these oscillating elements, besides agitating the bath of liquid in the tank, are moving across the path of the incoming newly added material, and the path of any coarser particles that tend to classify towards the bottom of the tank 10 is cut repeatedly by the various tubular elements swinging in an advancing motion, periodic or otherwise, through the unfiltered mixture. As a result of this, the heavier or coarser particles that would pass between the individual elements 19 were these elements merely advanced forwardly without any oscillatory movement, are intercepted by the upper portions and the side portions of the tubular elements 19 and are drawn onto the filter medium and held there by suction induced in said elements.

Figures 4, 6:
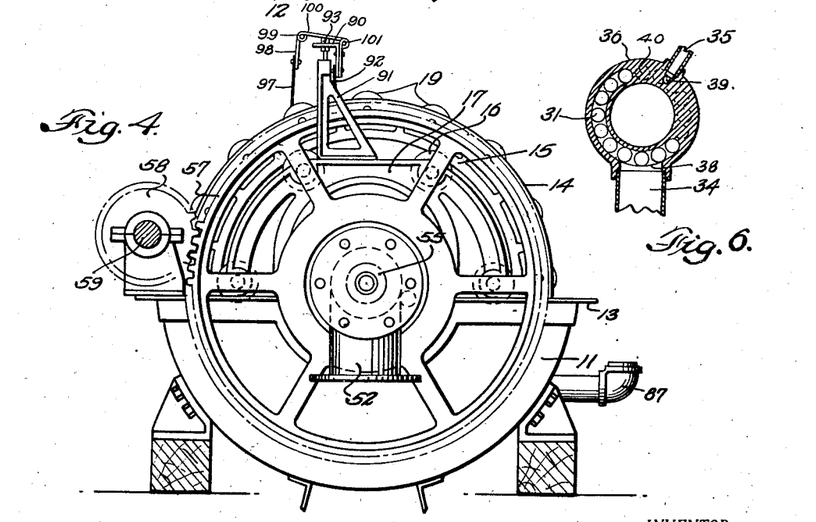
Fig. 4 is an end view showing the driving and discharge end of the apparatus.
Fig. 6 is a vertical cross-sectional view of the air and suction valve taken on the line 6—6 of Fig. 2.
Figure 5:
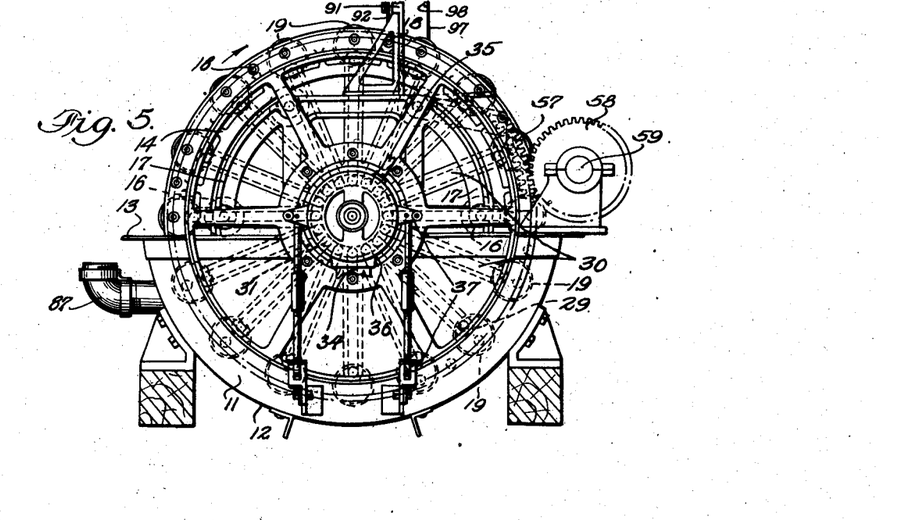
Fig. 5 is an end view of the opposite end of the apparatus showing the valved means and conduits supplying compressed air and for drawing off filtrate by suction.

As shown in Fig. 6 the suction chamber 38 is in communication with the conduits 31 and 30 of all those filter elements that are arranged and are oscillating within that portion of the circumference of the circle formed in vertical cross-section by the series of elements 19, from substantially 128° to 346° (from the top point as 0°), and the filter elements that are arranged within and are oscillating within that portion of said circle from substantially 346° to 128° are sealed off from the suction chamber and the compressed air chamber with the exception of those elements that are arranged within and oscillate within that portion of the circle from substantially 31° to 38°, and these excepted elements are in communication with the air chamber 39.

As shown, the series of elements 19 are oscillated for a distance substantially equal to the diameter of any one of said elements. Therefore:—as each of the elements makes a complete revolution the conduits 31 of the elements moving backward out of the bath are sealed off from the suction chamber while their respective elements are out of the bath and are brought into communication with the suction chamber when those elements are brought back into the bath, so there can be no short circuiting of suction past the bath to the atmosphere during oscillation of those elements just entering the bath that have not accumulated sufficient cake throughout to prevent such short circuit; the conduits 31 of these elements moving backward, during the oscillating strokes, from the discharge portion of the filter, and from which filter cake may have been blown off, are sealed from the suction chamber while their respective elements are to the left (Fig. 3) of the cake discharge position, and are brought back into communication with the air chamber upon forward movement of the series of filter elements; and the conduits of those elements next to be discharged of filter cake are sealed off from the suction chamber, while their respective elements still have filter cake on them, from that portion of said circle from about 346° to 360°; those conduits of the filter elements arranged within and oscillating within that portion of the said circle from substantially 128° to 346° are always in communication with the suction chamber, and there can be substantially no short circuiting of suction through them since those in the bath are submerged and those out of the bath are covered with filter cake.

As the elements under suction are either submerged or covered entirely with filter cake or solids, the solids in the bath are deposited with uniform resistance on all of the oscillating submerged elements. The coarser particles settle on the tops and on the sides of the elements, and the solids of finer nature and such coarse particles as have been mixed into the entire bath by the agitating action of the oscillating elements 19 are picked up by the undersides of the same elements. The resistance to filtration will be uniform as to the respective elements, through the growing deposit of solids on them as the elements 19 respectively progress through the bath. When the elements rise from submergence and progress toward the top of the circular path, air will be sucked in through the deposit on the respective elements, between the submergence level and the left side (Fig. 3) of the hopper 50, displacing most of the moisture remaining in the pores of the cake between the intercepted solid particles.

The filtrate free from suspended solids passes out through the nipple openings 29 of the ends of the longitudinal elements and through conduits 30 and 31 to the valve housing and thence out connection 34. If desired a separate outlet, similar to outlet 34, may be used for discharge of the moisture removed from those elements being subjected to suction that are above the submergence level.

In the event that the deposit or cake of solids on the elements 19 is merely to be dried before dumping into the conveyor-hopper 50, the construction shown in Figs. 1 to 5 will be sufficient. Liquid remaining in and drawn off from the cake on those elements 19 between the submergence level and the top of the hopper 50 drains out through the eccentric outlets 29, under suction, and as the elements laden with a deposit or cake of solids become positioned over adjacent hopper 50 they are automatically disconnected from any suction by means of a bridge member in valve housing 36, and the ports of conduits 31 of successive elements then oscillate in front of the compressed air port or chamber 39 communicating with connection 35 and this causes repeated puffs of air to blow into and through each successive element 19, thus discharging the cake of solids into hopper 50 from which it is removed by conveyor 54 to outlet 52.

In instances where it is desired to submit the deposit or cake of solids on the elements to a spray washing action of any other liquid in order to remove further original moisture of objectionable or valuable nature from the solids, those elements 19 rising from and out of submergence are subjected to sprays located either or both within and without the revolving cage of elements 19.

From the foregoing it will be apparent that the construction and principles involved in the present invention have decided advantages over drum type or disc type continuous filters now in use. In addition to providing for a larger filter area for the space occupied, and for substitution of or repairs to be made on individual elements, when any one filter medium has become injured or impaired, without disturbing the remainder of the elements, and for uniformly stressing the fabric walls of the respective elements during the counter-current with compressed air, or other fluid pressure means, and for avoiding the need for using wire windings over the filtering surfaces and scraping devices frictionally bearing on said wire windings for removing the cake thereon, the invention also provides for using the longitudinal rod-like shaped elements, having the foregoing advantages, as agitating arms, simultaneously with their use as filtering elements, when any convenient periodically or constantly advancing oscillating movement is given to the entire nest or cage of elements forming one filtration apparatus. The agitation of the bath, during filtration, by means of the filter elements themselves, not only produces a more uniform cake of solids but also requires less power to operate than a mechanical agitator operating separately from the filter element itself, and permits the use of suction filters on coarser material than can be handled in the well-known drum or disc type filters.

When not in use, the suction may be shut off and the material left in the tank 10 can be kept in a state of agitation. Any surplus feed is overflowed through a convenient overflow 87. For drainage purpose, a drainage outlet is provided in the bottom.

If desired, means, such as the stationary longitudinal bars 88 and vertical bars 89, may be employed to act as mixing baffles to prevent the bath of unfiltered material in the tank 10 from attaining a rythmic momentum, when swinging with the oscillating submerged elements.

It is obvious from the foregoing that a variety of known oscillating mechanisms, such as reversing gears, ratchets, escapements and the like may be employed, without departing from the spirit and scope of the invention. The particular mechanism shown for effecting the progressive oscillatory movement of the filter has been employed in preference because it is smooth running and continuously operating.

Figure 18:
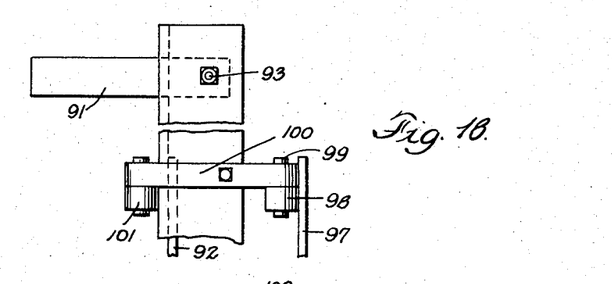
Fig. 18 is a top plan view of said wiper device.
Figure 19:
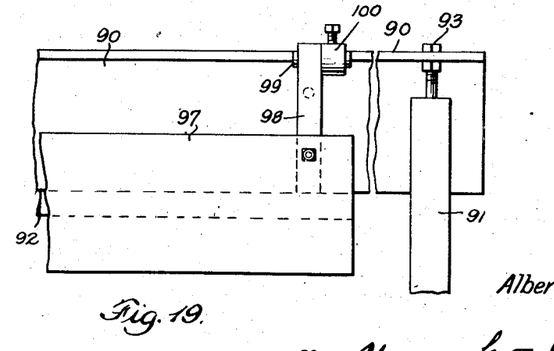
Fig. 19 is a front elevation of said wiper device.

In filtering materials of many kinds, and especially those that leave on the tubes a cake of considerable thickness (for instance, three-quarters of an inch or more), the cake will have sufficient body, and may have sufficient weight, to completely separate from and fall entirely free of the tubular elements during the cake discharge period when the individual tubes oscillate above the cake hopper and merely receive the air blast that enters the tubes during that period. But materials will be encountered in the filtration art that are of such character or adhesiveness that although the cake will be loosened from the fabric by the pulsating air entering the individual tubes during the discharge period, it will not all fall free of each tube. The lower half of the cake may fall into the hopper and the upper half may be so viscous in itself as to hang saddlewise over the upper portion of the tubes. In order to clear the tubes of such clinging portions of the filter-cake, there is employed the wiper device means indicated on Figs. 1, 2, 3, 4 and 5 and more particularly shown in Figs. 17, 18 and 19. An angle iron or sufficiently rigid piece 90 is adjustably supported on rigid brackets 91 at the opposite ends of the filter. To this piece 90 there is bolted or otherwise attached a flexible wiper 92 of rubber belting or similar material. The adjustments 93 permit fixing the position of this wiper 92 relative to the cloth surface of the tubes passing under the lower edge of said wiper. This edge is so adjusted that it does not make contact with the cloth surface but engages the filter-cake only. The air blow is so set that the tubular cloth covering of the individual tubes is inflated just prior to the meeting of the stationary wiper and any oscillating tube. The cake that may cling on the upper portion of the tube is thus brushed aside in both directions as any particular tube oscillates one or more times beneath said wiper 92. It is evident that the oscillating action of the revolving filter materially aids in this action, as more particularly shown in Fig. 17, which indicates filter-cake piece 94 falling freely from a tube oscillating beneath said wiper 92, the first oscillation to the right causing wiper 92 to wipe off a remaining filter-cake piece 95, and the return oscillation causing filter-cake piece 96 to be pushed away from the tube. If the travel of the filter tubes were continuously to the right and non-oscillating, filter-cake pieces similar to 96 might tend to remain clinging on the tube and be carried back into the filter bath.

Figure 17:
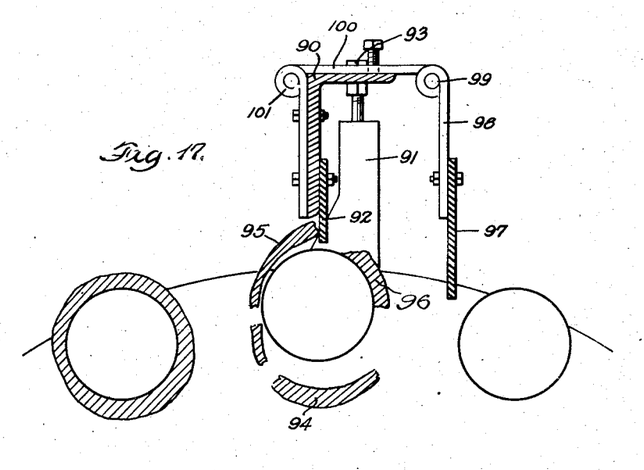
Fig. 17 is an enlarged vertical cross-sectional view of the filter-cake wiper device, and showing a manner of dislodgment of the filter cake from the filter tubes.

The action of this rigidly secured flexible wiper 92 may require to be, and is illustrated as, augmented by a following hinged or pendant wiper 97, more particularly of service when the clinging pieces of filter-cake are relatively thin. Said hinged or pendant wiper 97 is constituted of a piece of flexible rubber belting or similar material attached to linked members 98 which are hinged at 99 to members 100 that in turn are hinged at 101 to the aforesaid rigid support 90 of the before-mentioned wiper 92. This hinged supported rubber wiper 97 rides over an arc of the upper surface of the oscillating tubes after they pass from under the rigidly supported wiper 92, and so any remaining small pieces that are left clinging on the tubes are removed by this hinged supported pendant wiper, which works entirely flexibly, with the oscillations of the filter elements, not only between two oscillating elements but over a considerable arc of the upper surface of each element that passes such wiper. During some return oscillations, when said hinged wiper 97 may be resting on the top of any particular filter tube, the hinged link members 98 and 100 will prevent said wiper 97 and its link member 98 from jamming. The oscillating action of the filter members likewise aids the action of this follower wiper device in such instances.

The invention is hereinabove set forth as embodied in a particular structure and mode of operation but may be variously embodied within the scope of the claims hereinafter made.

I claim:

1. A filter apparatus comprising, in combination: a rotatable carrier; a plurality of horizontally extending filtering elements arranged around the circumference of the carrier, said filter elements being separated from each other to receive filtered material and filtrate on substantially their whole outer area; a tank for material to be filtered through which the filter elements pass as the carrier is rotated; and means for rotating said carrier with a progressive oscillatory movement.

2. A filter apparatus comprising, in combination: a rotatable carrier; a plurality of horizontally extending filtering elements arranged around the circumference of the carrier, said filter elements being separated from each other to receive filtered material and filtrate on substantially their whole outer area; a tank for material to be filtered through which the filter elements pass as the carrier is rotated; and means for moving the series of filter elements by an alternate forward movement and backward movement of lesser extent.

3. A filter apparatus comprising, in combination: a rotatable carrier; a plurality of horizontally extending filtering elements arranged around the circumference of the carrier, said filter elements being separated from each other to receive filtered material and filtrate on substantially their whole outer area; a tank for material to be filtered through which the filter elements pass as the carrier is rotated; and planetary gearing for oscillating the said series of filter elements and for advancing the series about its axis during one of the oscillatory movements thereof.

4. A filter apparatus comprising, in combination: a rotatable carrier; a plurality of horizontally extending filtering elements arranged around the circumference of the carrier, said filter elements being separated from each other to receive filtered material and filtrate on substantially their whole outer area; a tank for material to be filtered through which the filter elements pass as the carrier is rotated; and means for rotating said series of filter elements, said means comprising an oscillatory drive shaft operatively connected with said carrier, an oscillating gear fixed to said drive shaft, a rotatable eccentric, a pinion fixed thereon against rotation relative thereto, a pair of gears fixed on a common shaft and constantly in mesh with said oscillating gear and said pinion respectively, a casing pivotally mounted on said oscillatory shaft and supporting the said common shaft for rotation thereon, and a crank arm pivotally connecting said common shaft and the said eccentric at the axis of said pinion.

5. A rotary suction filter including filter elements movable progressively into and out of a bath to be filtered and driving means therefor adapted to move the filter elements through said bath with a progressive oscillatory movement.

6. A suction filter including a series of filter elements movable progressively into and out of a bath to be filtered, and means for imparting to said series of filter elements an alternate forward movement and backward movement of lesser extent.

7. A suction filter including a series of filter elements movable progressively into and out of a bath to be filtered, and planetary gearing for driving the series of elements progresively forward with an oscillatory movement.

8. A suction filter including a series of filter elements movable progressively through a bath to be filtered, means for imparting an oscillating agitating movement to said filter elements while in said bath, and means for advancing said filter elements progressively.

9. A suction filter including a rotary element; a gear thereon; a driving gear meshing with said gear; an oscillatory shaft for oscillating said driving gear; an oscillatory gear fixed to said oscillatory shaft; a fixed pinion fixed on its own axis and eccentrically mounted for rotation about a central axis; a a pair of gears mounted for similar movement about the same axis and in mesh with said oscillatory gear and said fixed pinion, respectively, an arm pivotally mounted to pivot about the same axis as the oscillatory shaft and carrying and holding the said pair of gears in mesh with said oscillatory gear and said fixed pinion, respectively; and an arm pivotally connecting said pair of gears with said fixed gear for bodily movement therewith.

10. A filter apparatus comprising a rotatable cage of separated tubular filter elements supported between two simultaneously revolvable spaced carrier members therefor, and means for oscillating the entire cage of tubular elements, whereby said elements agitate as well as filter the material to be filtered.

11. A filter apparatus comprising, in combination: a rotatable carrier; an annular series of horizontally extending filter elements arranged around the circumference of the carrier, said filter elements being separated from each other to receive filtered material on substantially the whole outer area of each of them; a receptacle for holding the material to be filtered through which the filter elements pass as the carrier is rotated; unfiltered material inlet means arranged within the annular series of filter elements and adapted to deliver unfiltered material to said tank above the filter elements submerged therein; and driving means adapted to oscillate the series of filter elements and to periodically advance them in a forward direction.

12. A filter apparatus comprising a rotatable cage of separated tubular filter elements movable successively through a filter bath and a drying sector, a filter-cake discharge sector, and a receiving hopper and conveyor located within the rotatable cage for receiving within the cage and discharging to the outside of said cage relatively dry solids discharged from the filter elements of said cage, said hopper having its rearward edge sufficiently advanced in the direction of rotation of said cage, substantially to avoid intercepting drip from the filter elements that are moving through the drying sector between the filter bath and the filter-cake discharge sector, and driving means adapted to oscillate the cage of filter elements and periodically advance the cage of filter elements in a forward direction.

13. A filter apparatus comprising, in combination: a carrier; a plurality of filter units supported by said carrier and arranged in an annular series around said carrier; a tank for material to be filtered; means for supporting said carrier for rotation about a horizontal axis, so that the filtering elements pass into and out of a bath in said tank as the carrier is rotated; peripheral ring-gearing for rotating said carrier; a driving gear for the peripheral ring-gearing for said carrier; and means for imparting to the driving gear a progressive oscillatory movement.

14. A filter apparatus comprising, in combination: a rotatable carrier; a series of tapered filter elements arranged around the circumference of the carrier; a tank for the material to be filtered through which the filter elements pass as the carrier is rotated; said filter elements being separated from each other to receive filter cake substantially on the whole outer surface thereof and extendinge horizontally throughout the length of the tank; and a series of conduits arranged at one end of said tank for inducing suction and for supplying air in alternation to said filter elements, said series of conduits communicating with said elements at their larger tapered ends through ports eccentric to said filter elements and arranged on the side thereof closest to the axis of rotation of the series of elements.

15. A filter apparatus comprising, in combination: a horizontally elongated tank; a series of filter elements spaced from each other and extending lengthwise of the tank and arranged in a peripheral series for rotation into and out of a bath in said tank; a series of radial conduits communicating with said filtering elements; a suction chamber and a compressed air chamber adapted to communicate with said conduits; a discharge hopper within the series of filter elements and extending longitudinally thereof and adapted to discharge filter-cake from the interior of said series; a conveyor for said hopper; means for advancing said series of filter elements into and out of the bath in said tank; and means adapted to oscillate said filter elements to agitate the bath during submergence of said elements in the bath.

16. A filter apparatus comprising a rotatable cage of separated tubular filter elements supported between two simultaneously revolvable spaced carrier members therefor, and means for oscillating the entire cage of tubular elements and to periodically advance them in a forward direction, whereby said elements agitate as well as filter the material to be filtered.

17. A filter apparatus comprising a rotatable cage of separated tubular filter elements mounted on a carrier therefor and fixed thereon against rotary movement relative thereto, a receiving hopper located within the rotatable cage for receiving within the cage and discharging to the outside of said cage filter-cake freed from the filter elements, means for oscillating the entire cage of filtering elements and to periodically advance them in a forward direction, and a wiper device rigidly supported above said hopper and filter elements in proximity to but free of contact with the filter surfaces of said elements.

18. A filter apparatus comprising a rotatable cage of separated tubular filter elements, a receiving hopper located within the rotatable cage for receiving within the cage and discharging to the outside of said cage filter-cake freed from the filter elements, a flexible wiper device rigidly supported above said hopper and filter elements in proximity to but free of contact with the filter surfaces of said elements, and a supplementary flexible wiper supported in a freely movable manner and adapted to brush the tubular filter elements as they pass from under the aforesaid rigidly supported flexible wiper.

19. A filter apparatus comprising a rotatable cage of separated tubular filter elements, a receiving hopper located within the rotatable cage for receiving within the cage and discharging to the outside of said cage filter-cake freed from the filter elements, a flexible wiper device rigidly supported above said hopper and filter elements in proximity to but free of contact with the filter surfaces of said elements, and means for blowing air into said tubular filter elements as they pass over said hopper.

20. A filter apparatus comprising a rotatable cage of separated tubular filter elements, a receiving hopper located within the rotatable cage for receiving within the cage and discharging to the outside of said cage filter-cake freed from the filter elements, a flexible wiper device rigidly supported above said hopper and filter elements in proximity to but free of contact with the filter surfaces of said elements, a supplementary flexible wiper supported in a freely movable manner and adapted to brush the tubular filter elements as they pass from under the aforesaid rigidly supported flexible wiper, and means for blowing air into said tubular filter elements as they pass over said hopper.

21. A filter apparatus comprising a rotatable cage of separated tubular filter elements, a receiver located within the rotatable cage for receiving within the cage and discharging to the outside of said cage filter-cake freed from the filter elements, a wiper device supported above said receiver and near said filter elements so as to be in proximity to but free of contact with the filter surfaces of said elements, and means for blowing air into said tubular filter elements as they pass over said receiver.

22. A filter apparatus comprising a rotatable cage of separated tubular filter elements, a receiver located within the rotatable cage for receiving within the cage and discharging to the outside of said cage filter-cake freed from the filter elements, and a wiper device supported above said receiver and near said filter elements so as to be in proximity to but free of contact with the filter surfaces of said elements, and a supplementary wiper device above said receiver and supported in a freely shiftable support and adapted to brush and to be shifted by the tubular filter elements as they pass from under the first aforesaid wiper device.

23. A filter apparatus comprising a rotatable cage of separated tubular elements, a receiver located within the rotatable cage for receiving within the cage and discharging to the outside of said cage filter-cake freed from the filter elements, and a wiper device above said receiver and carried by a freely shiftable hinge mounted for bodily shiftable movement in a support therefor whereby said wiper device may swing during brushing of the filter elements on movement thereof in one direction and may shift with its hinge on movement of the tubular filter elements in the opposite direction as they pass over said receiver.

24. A rotary suction filter including filter elements movable progressively into and out of a bath to be filtered and driving means therefor adapted to move the filter elements through said bath with a progressive oscillatory movement, said driving means comprising a continuously rotatable mechanism and means for converting the rotary movement of said mechanism into an oscillating movement.

25. A rotary suction filter including filter elements movable progressively into and out of a bath to be filtered and driving means therefor adapted to move the filter elements through said bath with a progressive oscillatory movement, said driving means comprising continuously rotatable gearing and means comprising other gearing for converting the rotary movement of said continuously rotatable gearing into an oscillating movement.

26. A filtering apparatus comprising, in combination: a tank; a rotary filtering medium movable into and out of a bath to be filtered in the tank; means adapted for imparting an oscillating agitating movement to said filtering medium while in said bath; and means for advancing said filtering medium progressively.

27. A filtering apparatus comprising, in combination: a tank for holding a bath of material to be filtered, a filtering medium movable into and out of the bath in said tank, said tank forming a structural unit and said filtering medium forming another structural unit, means for moving said filtering medium into and out of the bath in said tank, and means for imparting a bath-agitating oscillating-movement to one of said units relative to the other.

In testimony whereof I have hereunto set my hand.

ALBERT L. GENTER.